(12) United States Patent
Osakabe

(10) Patent No.: US 7,804,625 B2
(45) Date of Patent: Sep. 28, 2010

(54) SCANNING UNITS AND IMAGE READING DEVICES

(75) Inventor: Yoshinori Osakabe, Seto (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 943 days.

(21) Appl. No.: 11/616,724

(22) Filed: Dec. 27, 2006

(65) Prior Publication Data
US 2007/0146817 A1 Jun. 28, 2007

(30) Foreign Application Priority Data
Dec. 27, 2005 (JP) ............................. 2005-374093

(51) Int. Cl.
*H04N 1/04* (2006.01)
(52) U.S. Cl. ........................ 358/474; 358/497; 358/498; 358/496
(58) Field of Classification Search ................. 358/474, 358/497, 498, 496
See application file for complete search history.

(56) References Cited
U.S. PATENT DOCUMENTS
7,554,701 B2 * 6/2009 Hong et al. .................. 358/474

FOREIGN PATENT DOCUMENTS
JP H05-145705 A 6/1993
JP 2003-158614 A 5/2003

* cited by examiner

*Primary Examiner*—Houshang Safaipour
(74) *Attorney, Agent, or Firm*—Baker Botts L.L.P.

(57) ABSTRACT

A scanning unit is configured to slide along a guide shaft that extends in a predetermined direction. The scanning unit includes a carriage configured to slide along the guide shaft, a bearing which is disposed on a carriage and through which the guide shaft passes, and an elastic deformation allowance mechanism which permits elastic deformation of the external shape of the bearing in the predetermined direction at a predetermined time. For example, a contact image sensor unit includes a box equipped with a contact image sensor. The box has a bearing through which a guide shaft is inserted. The bearing has a pair of bosses, bushings that fit therein, and a coil spring that is disposed between the bushings. The bushings are urged by the coil spring, so that the bushings continually protrude outwards. As the contact image sensor unit slides along the guide shaft, the bushings insert in between the bosses when the bushings abut the wall surface of the frame, so that the bearing is deformed elastically. An image reading device may include a scanning unit.

14 Claims, 9 Drawing Sheets

SCANNING UNITS AND IMAGE READING DEVICES

BACKGROUND OF THE INVENTION

1. Field of the Invention

This application claims the benefit of Japanese Patent Application No. 2005-374093, filed Dec. 27, 2005, which is incorporated herein by reference.

The present invention relates to image reading devices that are used in multifunction devices ("MFDs"), and more specifically relates to the structures of the image sensor units used in these image reading devices.

2. Description of Related Art

FIG. 1 is a perspective view of significant elements of a known conventional image reading device. This image reading device has an image sensor unit 10. Image sensor unit 10 has a contact-type image sensor ("CIS") 11 and a carriage 12 that holds contact image sensor 11. Carriage 12 is supported by a guide shaft 13 and slides in the direction indicated by arrow 14 by means of a slide device not shown in the drawings. Carriage 12 has a pair of bearings 15, 16, and guide shaft 13 is inserted or extends through bearings 15, 16. In addition, a contact glass plate that is not shown in FIG. 1 is disposed above image sensor unit 10, and a document is placed on this contact glass plate for image reading. Contact image sensor 11 reads an image from the document when carriage 12 slides in the direction indicated by arrow 14.

In order to achieve higher-precision image reading, carriage 12 must not chatter with respect to guide shaft 13 during sliding. If carriage 12 chatters against guide shaft 13, contact image sensor 11 oscillates or vibrates in the direction of arrow 17 during image reading, preventing the image from being read properly. For this reason, bearings 15 and 16 in known image reading devices have mechanisms for tightening guide shaft 13 in the radial direction, such as in Japanese Unexamined Patent Application Publication No. 2003-158614. Further, members have been provided for filling in gaps between bearings 15, 16 and guide shaft 13, such as in Japanese Unexamined Patent Application Publication No. H05-145705.

Nevertheless, a distance 18 between the pair of bearings 15, 16 is extremely small relative to the dimension in the length-wise direction of carriage 12. For this reason, dramatic effects have not been attained, even though these known-types of countermeasures have been employed. In addition, distance 18 may be increased in order to prevent chattering of carriage 12 against guide shaft 13. Nevertheless, when distance 18 is increased, the external dimension of the image reading device in the direction of arrow 14 also is increased. There is a strong incentive for reducing the size and weight of image reading devices that employ contact image sensors, and increasing distance 18 runs counter to this demand.

SUMMARY OF THE INVENTION

A need has arisen to provide image reading devices which are of sufficiently reduced size and weight and which also allows higher-precision image reading. It is a technical feature of such devices that they may include an image sensor unit that is used therein, as well as a scanning unit. It is an advantage of the present invention that the scanning unit may be supported over a broader region on the guide shaft when an image is being read, and, thus, higher-precision image reading may be achieved while controlling the inclination of the carriage. In addition, because the external dimensions of the carriage may be decreased during image reading standby and at other desired times, it is possible to achieve a reduction in the size and the weight of the scanning unit, as well as the image reading device that employs the scanning unit.

In order to satisfy the aforementioned need, the scanning unit of the present invention may be a scanning unit that slides along a guide shaft that runs in a predetermined direction, and has a carriage that slides along the aforementioned guide shaft, a bearing provided on the carriage through which the aforementioned guide shaft passes and an elastic deformation allowance mechanism that allows elastic deformation of the external shape of the bearing in the aforementioned predetermined direction at the predetermined time.

The scanning unit moves along the aforementioned guide shaft along with the carriage. The guide shaft passes through the bearing provided on the carriage, and this bearing elastically deforms in the predetermined direction. In other words, the external dimension of the carriage changes in the predetermined direction or in the direction of sliding. Consequently, when the external size of the bearing is increased, the carriage may slide while restricting inclination because the aforementioned guide shaft inserts into said bearing over a broader region. When the external size of the bearing is reduced, on the other hand, the external dimension in the carriage sliding direction is decreased, and, thus, the size of the scanning unit is decreased.

The aforementioned bearing preferably has a bearing ring that may slide in the aforementioned predetermined direction and through which the aforementioned guide shaft may pass. Preferably, the aforementioned elastic deformation allowance mechanism has an urging member that elastically urges the aforementioned bearing ring, so that the bearing ring protrudes beyond the external wall surface of the aforementioned carriage.

In this configuration, the guide shaft is supported on a bearing, and, thus, the structure of the bearing is simplified. The external size of the aforementioned bearing increases as a result of the elastic urging of the bearing ring outwards beyond the external wall surface of the carriage, and the external size of the aforementioned bearing decreases when the bearing ring is made to slide against the elastic force counter to the outwards-urging direction. In this manner, the elastic deformation of the bearing is dramatically simplified by providing the urging member.

It is preferable for a contact image sensor to be mounted on the aforementioned carriage. By this means, the scanning unit may be effectively reduced in weight and size. Preferably, the aforementioned contact image sensor has a box that houses a light source and light-receiving element, and this box preferably also functions as the aforementioned carriage. By this means, the size of the carriage may be reduced, and the size and weight of the scanning unit also are decreased.

In order to satisfy the aforementioned need, the image reading device of the present invention has a casing having a contact glass plate on which a document is placed, and a scanning unit disposed in the casing which slides along a guide shaft that extends in a predetermined direction in order to scan the aforementioned document. The aforementioned scanning unit has a carriage, a bearing that is provided on the carriage and through which the aforementioned guide shaft is inserted, and an elastic deformation allowance mechanism that allows elastic deformation of the external shape of the bearing in the aforementioned predetermined direction at the predetermined time.

The document is scanned when the document is placed on the contact glass plate and the scanning unit slides along the guide shaft. The guide shaft passes through the bearing provided on the carriage, and the bearing elastically deforms in the aforementioned predetermined direction.

When the document is scanned, more specifically, when the carriage slides along the guide shaft, the aforementioned bearing elastically expands in the aforementioned predetermined direction, thereby increasing its external size. In this case, the guide shaft is supported on the bearing over a broader region, and, thus, the carriage may slide while restricting inclination. When scanning of the document stops, on the other hand, or when the scanning unit is on stand-by prior to scanning of the document, more specifically, when the carriage is in contact with the inner wall surface of the casing; the inner wall surface or a member that is provided on the inner wall surface abuts the aforementioned bearing. By this means, the bearing is pressed on by the inner wall surface or the member, and deforms elastically. Consequently, the bearing size is decreased and the dimension of the carriage decreases in the aforementioned predetermined direction, thereby decreasing the size of the scanner unit.

The aforementioned bearing preferably comprises a bearing ring that is provided slidably in the aforementioned predetermined direction and through which the aforementioned guide shaft is inserted. Preferably, the aforementioned elastic deformation allowance mechanism comprises an urging member that elastically urges the aforementioned bearing ring, so that it protrudes beyond the external wall surface of the aforementioned carriage.

In this configuration, the guide shaft is supported on the bearing ring, and, thus, the structure of the bearing is simplified. Because the bearing ring is elastically urged outwards beyond the external wall surface of the carriage, the external size of the bearing increases. In addition, when the aforementioned bearing slides in opposition to the elastic force and counter to the urging direction, the external size of the aforementioned bearing decreases. By providing an urging member in this manner, elastic deformation of the bearing is dramatically simplified.

Preferably, the aforementioned carriage preferably has a mounted contact image sensor. By this means, the scanning unit may be effectively decreased in size and weight. The aforementioned contact image sensor comprises a box that houses a light source and light-receiving element, and this box also serves as the aforementioned carriage. By this means, the size of the aforementioned carriage is decreased, and the weight and size of the scanning unit are additionally decreased.

It is preferable for a pair of the aforementioned bearing rings to be disposed symmetrically on both sides of the aforementioned carriage in the aforementioned predetermined direction. The scanning unit moves back and forth along the guide shaft from the upstream end in the aforementioned predetermined direction towards the down-stream end, and from the down-stream end toward the up-stream end. For this reason, the aforementioned bearing undergoes elastic deformation and the size of the scanning unit decreases in cases in which the scanning unit is positioned at the upstream end in the aforementioned predetermined direction, or when the scanning unit is positioned at the downstream end.

The aforementioned bearing ring may be disposed on only one side of the carriage in the aforementioned predetermined direction. By disposing a bearing ring on only one side of the carriage, the number of parts is decreased and costs also may be reduced. On the other hand, because a bearing ring is not disposed on the opposite side, the size of the device may be reduced. The aforementioned bearing ring may be disposed on the downstream side of the aforementioned carriage in the aforementioned predetermined direction.

When the scanning unit is not reading an image, the unit generally is disposed on the upstream side in the aforementioned predetermined direction because image reading may be initiated immediately after the document is placed on the contact glass plate. Nevertheless, when the aforementioned bearing ring is disposed on the upstream side in the aforementioned predetermined direction, the urging member is constantly elastically deformed when image reading is not occurring. As a result, the outward force continually acts on the carriage, and a load is continually placed on the carriage sliding mechanism. In the present invention, a stronger carriage and casing design is achieved because outwards force or load of this type is not in action when image reading is not occurring.

Further objects, features, and advantages of the present invention will be understood from the following detailed description of preferred embodiments of the present invention with reference to the accompanying drawings.

BRIEF DESCRIPTION OF THE DRAWINGS

Embodiments of the invention now are described with reference to the accompanying drawings, which are given by way of example only, and are not intended to limit the present invention.

DETAILED DESCRIPTION OF PREFERRED EMBODIMENTS

The invention is described in detail below based on preferred embodiments in reference to the appropriate drawings.

Figure 1:
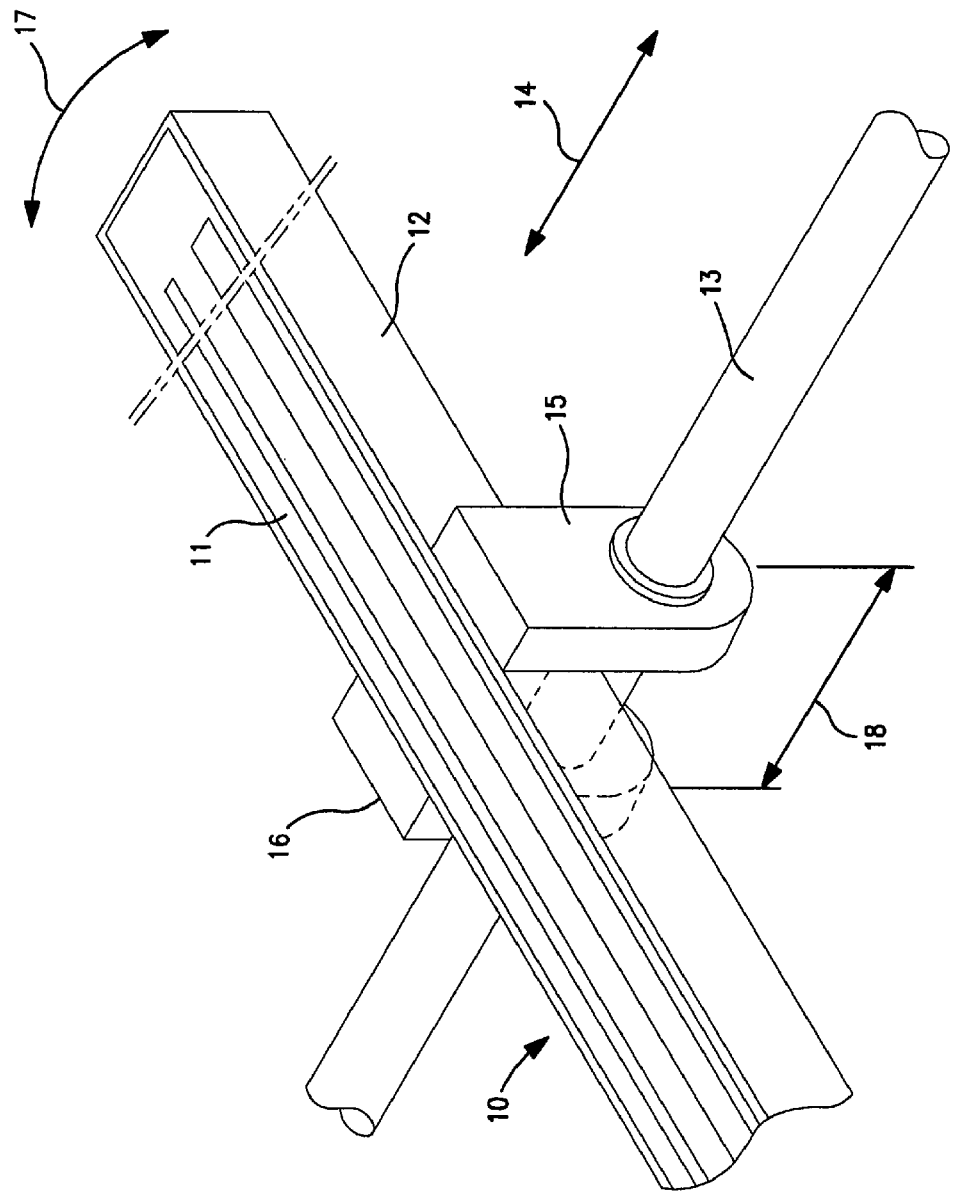
FIG. 1 is a perspective view of significant components of a known image reading device.
Figure 2:
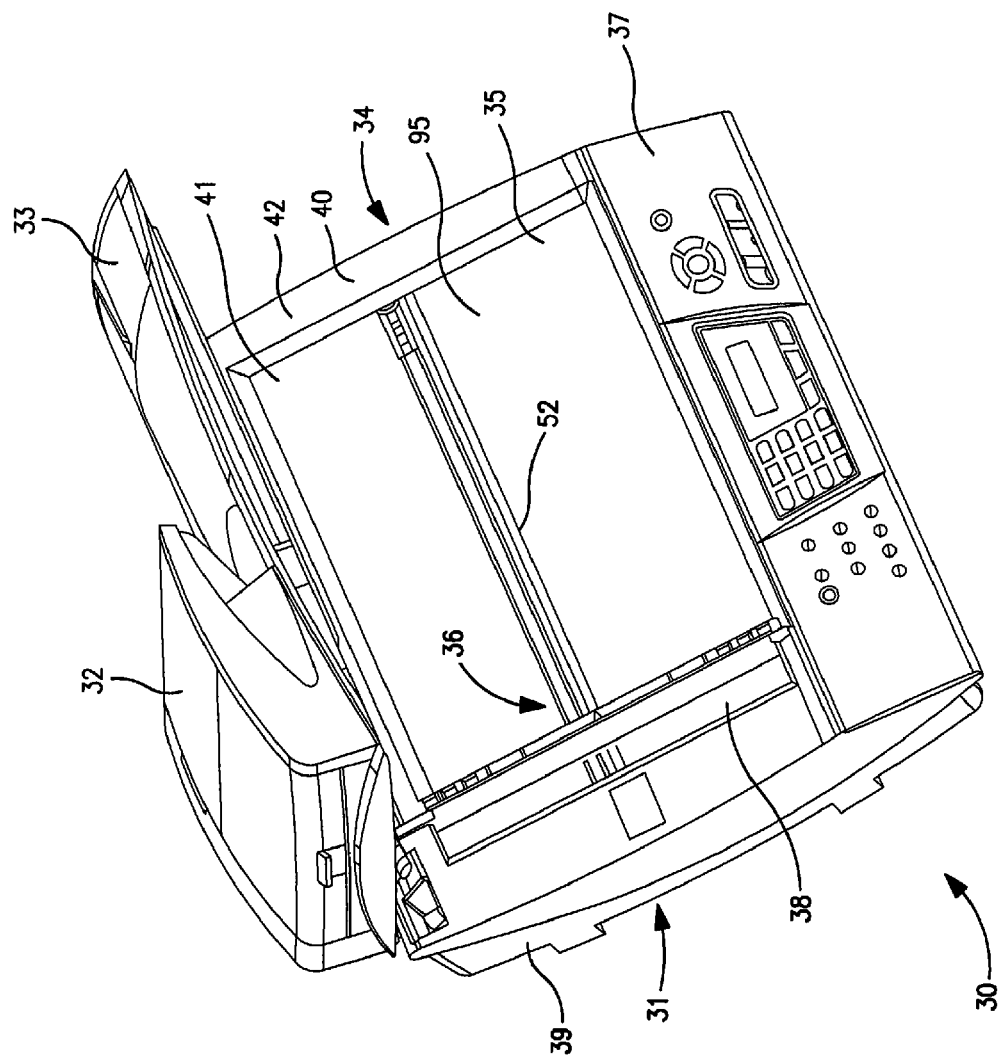
FIG. 2 is a perspective view of the image reading device of an embodiment of the present invention.

FIG. 2 is an external perspective of an image reading device 30 pertaining to an embodiment of the present invention. Image reading device 30 is used as a scanner part in a multi-functional device ("MFD") that has an integrated printer function and scanner function. Alternatively, the device may be configured as an image reading part for copiers. Image reading device 30 also may be configured, for example, as a flat bed scanner ("FBS") that has only a scanning function.

As shown in the drawings, image reading device 30 has a reading placement table 31 that functions as an FBS, and a document press cover 33 is attached on the reading placement table 31, so that it may be opened and closed. Document press cover 33 has an auto-document feeder ("ADF") 32. The reading placement table 31 has a substantially square, main frame 34 (e.g., a casing), a contact glass plate 35 that is provided at the top surface of main frame 34 and an image reading unit 36 that is housed in main frame 34. The document is placed on contact glass plate 35. This document is fixed on contact glass plate 35 by document press cover 33 when document press cover 33 is closed. Thus, image reading unit 36 reads the image from the document while moving along contact glass plate 35 under contact glass plate 35.

An operating panel 37 is provided on the front side of reading placement table 31. Operating panel 37 may have a liquid crystal display and various operating buttons. Image reading device 30 is designed to function based on instructions from operating panel 37. When image reading device 30 is configured as an MFD, a computer may be linked to image reading device 30. In this case, image reading device 30 may be operated by means of instructions from operating panel 37 or by means of instructions sent from the computer via a scanner driver, printer driver, or the like.

In the manner described above, document press cover 33 comprises ADF 32 that continuously feeds documents from a document tray to a discharge tray. During the process in which the documents are transported by ADF 32, the documents pass by a platen 38, and the image reading unit 36 that is stationed in a predetermined stationary position below platen 38 reads images from the documents. Nevertheless, ADF 32 is not required for this embodiment.

Figure 3:
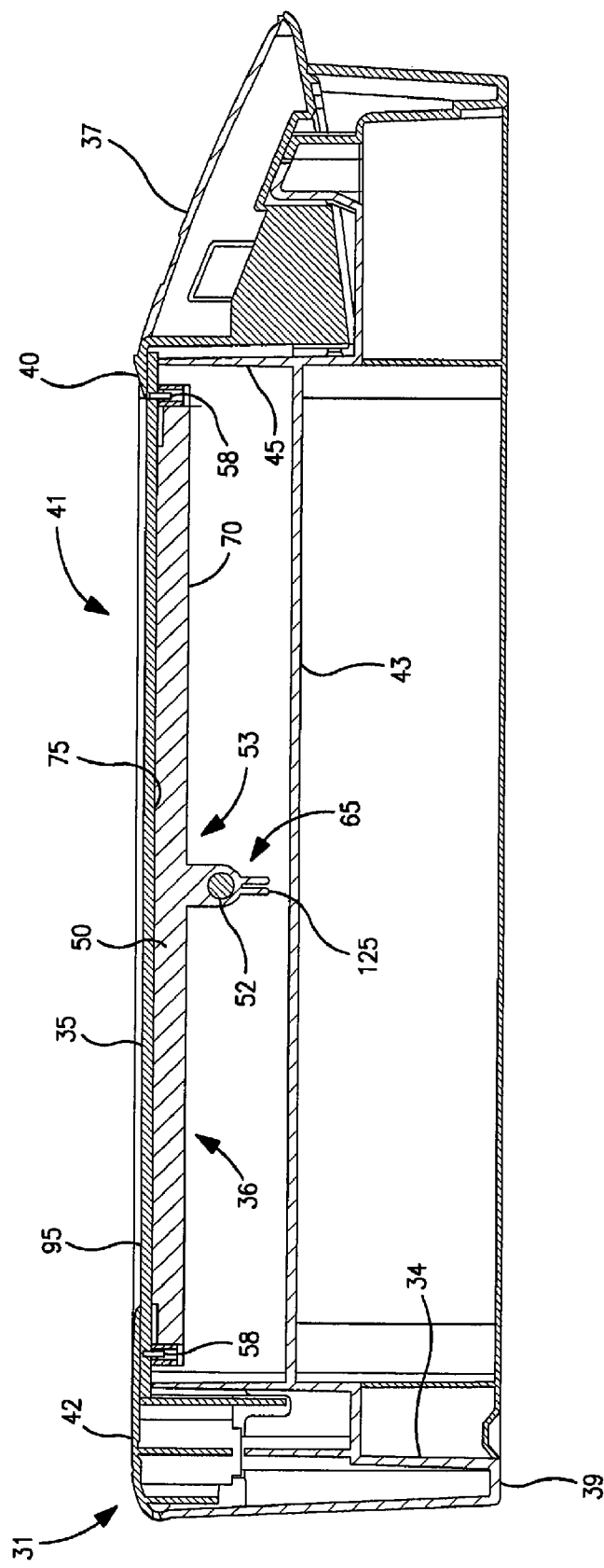
FIG. 3 is a cross-sectional view of the reading placement table of the image reading device of the embodiment of the present invention, as depicted in FIG. 2.

FIG. 3 is a cross-sectional view of reading placement table 31. In FIG. 3, document press cover 33 and ADF 32 of FIG. 2 are not shown.

As shown in FIGS. 2 and 3, main frame 34 of reading placement table 31 has a container-type lower frame 39 that is open at the top and an upper cover 42 having an opening 41 on the top surface 40. Upper cover 42 fits into the top of lower frame 39, thus configuring main frame 34. Contact glass plate 35 is attached to upper cover 42 and is exposed at the aforementioned opening 41. An upper surface 95 of contact glass plate 35 constitutes a document placement surface on which the aforementioned document is placed. Opening 41 delineates this document placement surface.

Image reading unit 36 is disposed inside lower frame 39. Lower frame 39 and upper cover 42 are both formed from synthetic resin. Lower frame 39 has a base 43 that constitutes the lower plate, side walls 44 (referring to FIG. 4) that are disposed at the periphery of a base 43 and a partitioning plate 45, which are formed in an integrated manner. Partitioning plate 45 divides the region in which image reading unit 36 is disposed from the region in which the wiring boards or the like for operating panel 37 are disposed. Lower frame 39 has a support rib for supporting contact glass plate 35, bosses for screwing in the various members, and passage holes for electrical wiring and the like. These elements are designed suitably in accordance with the mode of implementation of reading placement table 31, and, thus, detailed descriptions are not provided here.

Image reading unit 36, as shown in FIG. 3, comprises a CIS unit 50 (e.g., the scanning unit) and a belt drive mechanism 53 that has a guide shaft 52. In addition, image reading unit 36 comprises a roller unit 58. Roller unit 58 abuts a lower surface 75 of contact glass plate 35, and aids in smooth movement of CIS unit 50. CIS unit 50 comprises a so-called contact-type image sensor or a contact image sensor mounted thereon. CIS unit 50 receives reflected light from the document when the document is illuminated with light, and converts the received light into electrical signals. CIS unit 50, as described in detail below, comprises an elongated rectangular box 70 (e.g., the carriage), and box 70 fits together with guide shaft 52. Thus, box 70 moves below contact glass plate 35.

Specifically, guide shaft 52 is installed in the width-wise direction of lower frame 39. The description "width-wise direction of the lower frame 39" refers to a direction along lower surface 75 of contact glass plate 35 that is orthogonal to the longitudinal direction of box 70 of CIS unit 50. Specifically, this direction is perpendicular to the paper surface in FIG. 3. This direction (e.g., the direction perpendicular to the paper surface in FIG. 3) is referred to as the "transverse direction." Box 70 moves by sliding on guide shaft 52 while being driven by a belt drive mechanism 53. Guide shaft 52 is described in detail below, but comprises a coil spring 63 (referring to FIG. 3) and is thereby urged elastically upwards. Consequently, box 70 is urged, so that it makes close contact with the contact glass plate 35, and moves in the aforementioned transverse direction along contact glass plate 35 in a condition in which box 70 is pressed against contact glass plate 35.

As shown in FIG. 3, roller units 58 are provided at both ends of CIS unit 50. Roller unit 58 comprises a roller that rotates in the aforementioned transverse direction, and this roller abuts lower surface 75 of contact glass plate 35. Consequently, when CIS unit 50 moves in the aforementioned transverse direction (e.g., the direction perpendicular to the paper surface in FIG. 3), the aforementioned rollers rotate along contact glass plate 35 along therewith. Because roller units 58 are provided, CIS unit 50 moves smoothly along contact glass plate 35, even though CIS unit 50 is being pressed onto the lower surface of contact glass plate 35.

Figure 4:
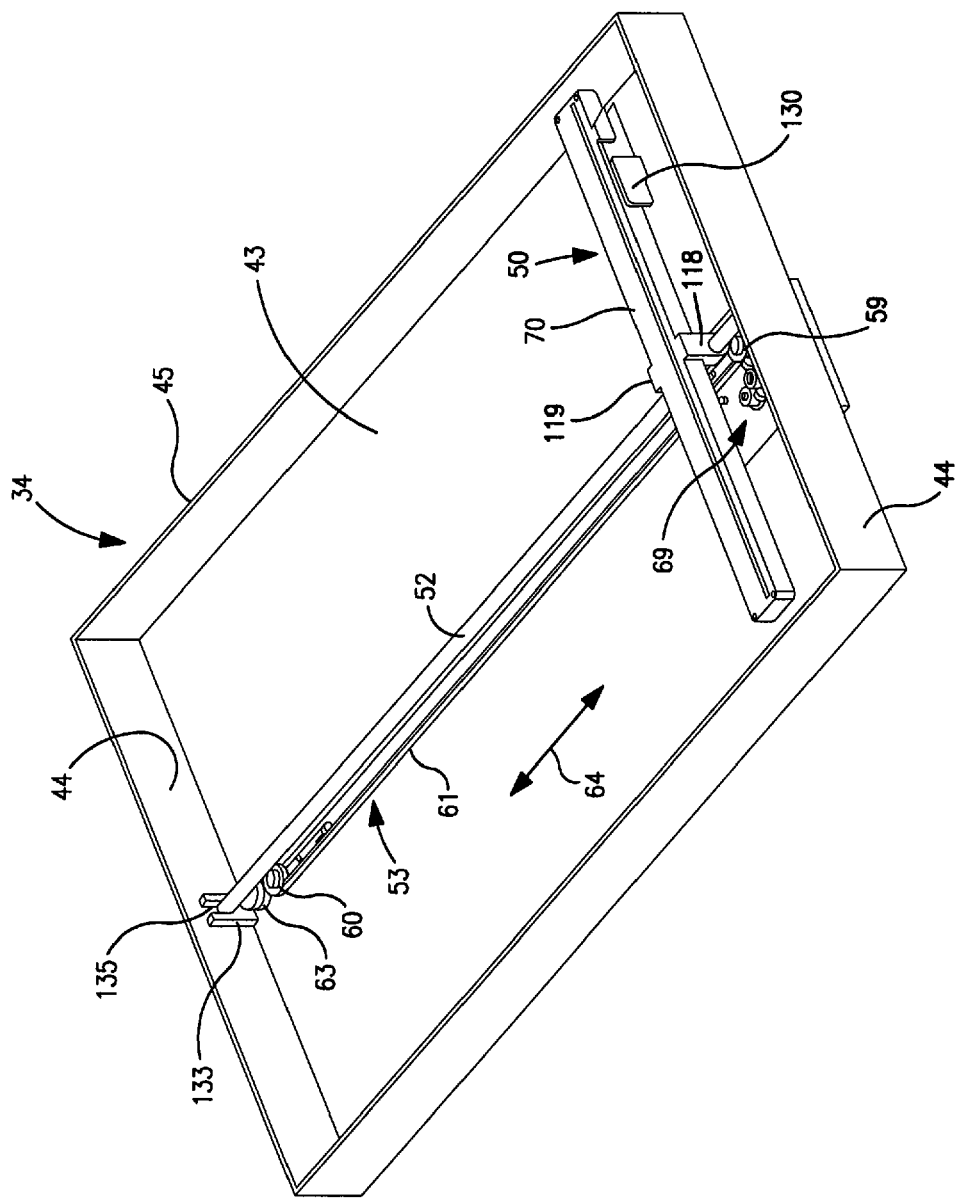
FIG. 4 is an enlarged, perspective view of significant components of the image reading unit of the image reading device of the embodiment of the present invention, as depicted in FIG. 2.

FIG. 4 is an enlarged, perspective view of the significant components of image reading unit 36. FIG. 4 shows the support structure of CIS unit 50 and the configuration of belt drive mechanism 53 along with main frame 34 of reading placement table 31.

Belt drive mechanism 53 comprises a drive part 69 with a motor that drives drive pulley 59, guide shaft 52, a power transfer pulley 60, and a timing belt 61 that is suspended between them. Timing belt 61 is an endless belt that has teeth on an interior surface. Thus, a configuration is produced in which timing belt 61 revolves when the motor of drive part 69 causes drive pulley 59 to rotate.

A section between power transfer pulley 60 and drive pulley 59 of timing belt 61, or a section along guide shaft 52 is linked to box 70. Specifically, timing belt 61 is held by a connector 125 of box 70 (referring to FIG. 3), and, thus, box 70 moves along with the timing belt 61. As an alternative to an endless belt, the timing belt 61, of course, also may be an open-ended belt having both ends of the belt fixed to a carriage 51.

Figure 5:
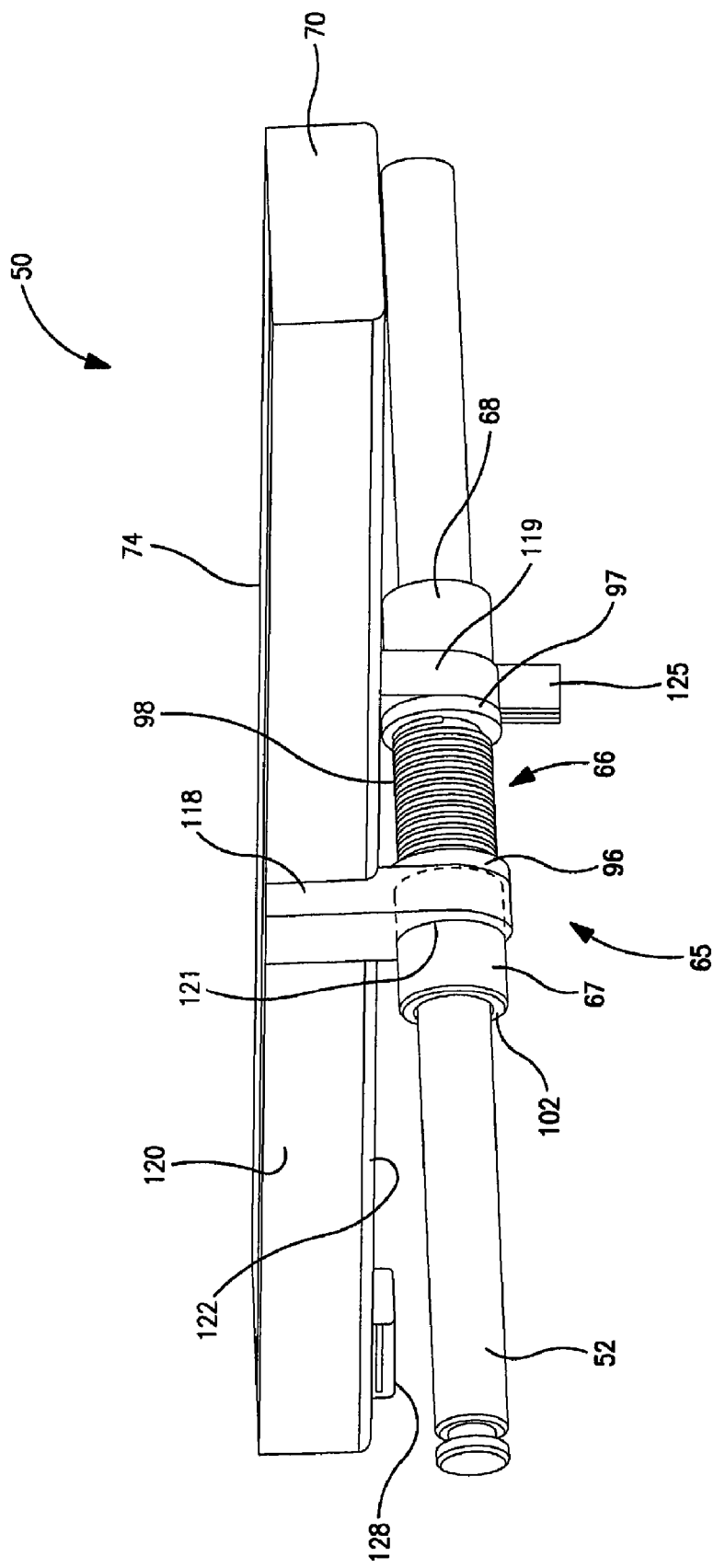
FIG. 5 is a perspective view of the CIS unit of the image reading device of the embodiment of the present invention, as depicted in FIG. 2.
Figure 6:
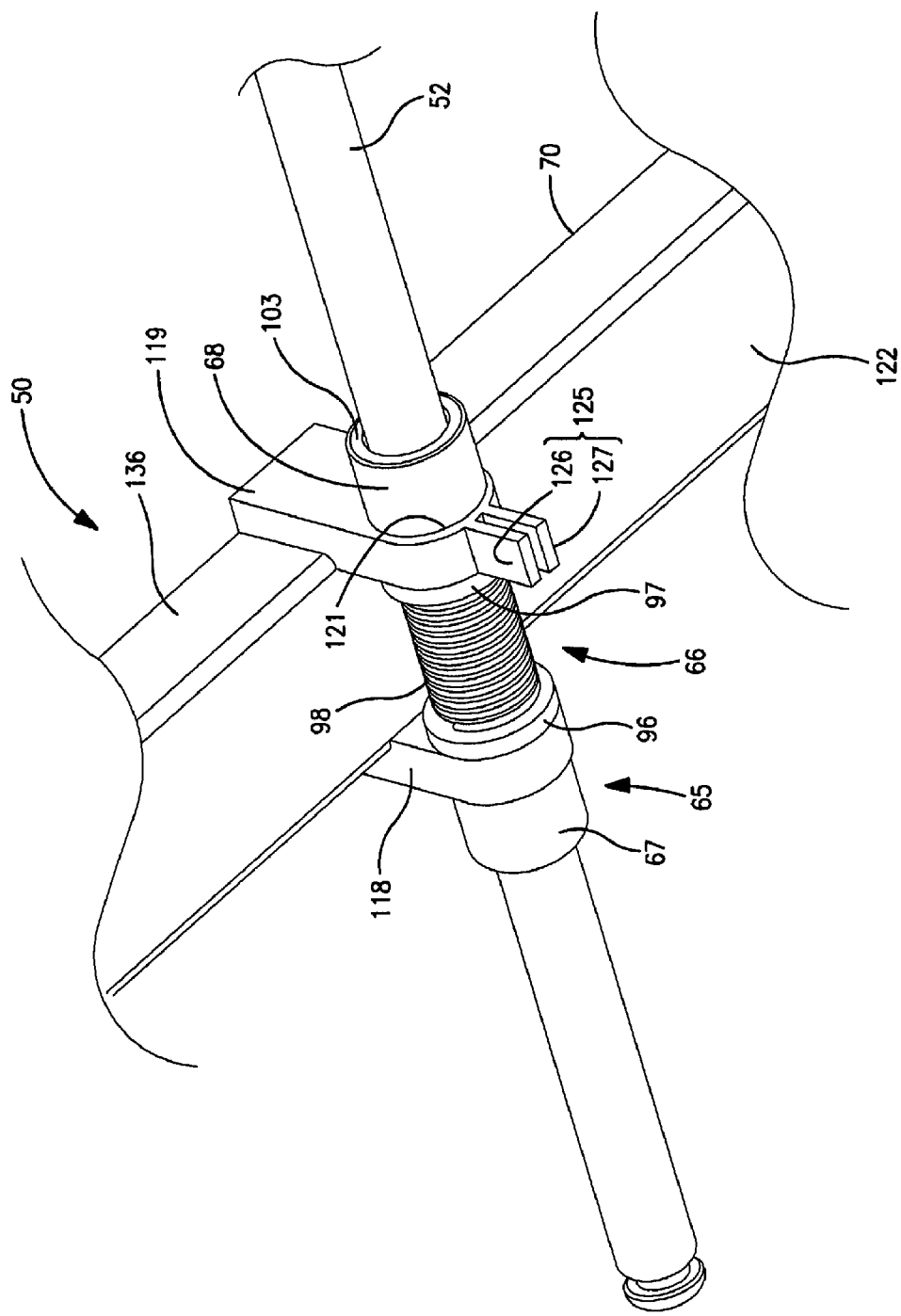
FIG. 6 is an enlarged, perspective view of the CIS unit of the reading device of the embodiment of the present invention, as depicted in FIG. 2.

FIG. 5 is a perspective view of CIS unit 50, and FIG. 6 is an enlarged, perspective view of significant components of CIS unit 50.

As shown in FIGS. 5 and 6, CIS unit 50 comprises box 70, the aforementioned contact image sensor provided in box 70, bearing 65, and a deformation allowance mechanism 66 (e.g., an elastic deformation allowance mechanism) that allows elastic deformation of the external shape of bearing 65 in the aforementioned transverse direction, specifically, in the longitudinal direction (e.g., a predetermined direction) of guide shaft 52.

Box 70 is formed, for example, from synthetic resin, and is formed in the shape of an elongated rectangle, as shown in FIGS. 5 and 6. The contact image sensor disposed in box 70 has a light source and light-receiving elements. An upper surface 74 of box 70 is opposite lower surface 75 of contact glass plate 35 (referring to FIG. 3). Consequently, the aforementioned light source and light-receiving elements are also in proximity to and opposite lower surface 75 of contact glass plate 35.

Suitable contact image sensors have known structures, and, thus, a detailed description is not provided here. Nevertheless, the aforementioned light source may comprise a light-emitting diode ("LED") and a light guide. This LED is disposed substantially at the center of box 70, and the light guide may be formed from transparent, synthetic resin and opens onto upper surface 74 of box 70, extending across the entire length of box 70. The light emitted from the LED is conducted across substantially the entire length of box 70 by the light guide, and, thus, the light that is emitted from the LED is distributed substantially uniformly across substantially the entire length of box 70 and illuminates the document.

In this embodiment, a plurality of light-receiving elements are disposed on box 70. The light-receiving elements are disposed in parallel rows along the longitudinal direction of box 70 in the lower inner region of box 70. Each light-receiving element comprises a condensing lens, and the condensing lenses are exposed at upper surface 74 of box 70. The light that illuminates the document and is reflected back is condensed by the condensing lenses, and then is received by the corresponding light-receiving elements. These light-receiving elements may be photoelectric conversion elements that output electrical signals based on the received light. The electrical signals are image signals generated from the image that is presented by the document.

A bearing 65 comprises a pair of bosses 118, 119 disposed at the center of box 70. Each boss 118, 119 is formed integrated with box 70. Boss 118 is disposed on a side surface 120 in the transverse direction of box 70 (e.g., an outer wall surface of the carriage, referring to FIG. 5). Boss 119 is disposed on another side surface 136 in the transverse direction of box 70 (e.g., the outer wall surface of the carriage, referring to FIG. 6). Bosses 118, 119 are shaped as elongated flat plates, and protrude beyond a lower surface 122 of box 70, as shown in FIGS. 5 and 6. A passage hole 121 that passes through boss 118 in the aforementioned transverse direction (referring to FIG. 5) is disposed at the lower end of the boss 118, Passage hole 121 that passes through boss 119 in the aforementioned transverse direction (referring to FIG. 6) is disposed at the lower end of boss 119.

The centers of each of passage holes 121 provided on bosses 118, 119 are aligned on an axis that extends in a transverse direction to box 70, and each passage hole 121 is disposed on the axis at positions that are lower than lower surface 122 of box 70. As shown in FIGS. 4-6, guide shaft 52 inserts into each of passage holes 121. Consequently, bosses 118,119 are supported on inserted guide shaft 52. In other words, box 70 is situated above guide shaft 52 via bearing 65.

In this embodiment, each boss 118, 119 comprises a bushing 67, 68 (e.g., bearing rings). Bushings 67, 68 function as liners when inserting guide shaft 52 into bosses 118, 119. Each of bushings 67, 68 is disposed symmetrically, as shown in FIGS. 6 and 7. By providing bushings 67, 68, guide shaft 52 may slide extremely smoothly with respect to bosses 118, 119.

Each bushing 67, 68 is formed as a cylinder, as shown in FIGS. 5 and 6, and fits into boss 118, 119, respectively. Each bushing 67, 68 slides freely in the longitudinal direction of guide shaft 52 with respect to boss 118, 119. Each bushing 67, 68 comprises a flange 96, 97. The external diameters of flanges 96, 97 are greater than the inner diameter of passage holes 121 provided in bosses 118, 119. Consequently, when bushing 67 slides to the left in FIG. 5, flange 96 abuts boss 118, thereby restricting sliding of bushing 67 in this direction. Similarly, when bushing 68 slides to the right in FIG. 6, flange 97 strikes boss 119, thereby restricting sliding of bushing 68 in this direction.

A coil spring 98 (e.g., the urging member) is interposed between bosses 118, 119, specifically, between flanges 96, 97 of bushings 67, 68. The aforementioned guide shaft 52 is inserted inside coil spring 98, and, thus, both ends of coil spring 98 abut flanges 96, 97. By this means, each bushing 67, 68 is urged elastically, so that bushings 67, 68 are separated continually from each other. As a result, bushing 67 protrudes outwards from the side surface 120 of box 70, and the bushing 68 protrudes outwards from side surface 136 of box 70.

When each bushing 67, 68 is pressed in a direction whereby each bushing 67, 68 approaches the other in opposition to the elastic force of coil spring 98, coil spring 98 is compressed, and each bushing 67, 68 slides along the inside of box 70, thereby decreasing the distance between end surface 102 of bushing 67 (referring to FIG. 6) and end surface 103 of bushing 68 (referring to FIG. 7). Specifically, the external shape of bearing 65 is deformed elastically in the longitudinal direction of guide shaft 52. Deformation allowance mechanism 66 is actuated by coil spring 98 and bushings 67, 68 that may slide and insert into bosses 118, 119.

As shown in FIG. 6, box 70 has a connection 125. Connection 125 holds a timing belt 61 of belt drive mechanism 53 (referring to FIG. 4), and transfers drive power for sliding box 70 from belt drive mechanism 53. In this embodiment, connection 125 is disposed on boss 119 of bearing 65. Specifically, this connector 125 has a pair of flat plates 126, 127 which are disposed so that they are opposite each other in the longitudinal direction of box 70. Thus, timing belt 61 is sandwiched between the flat plates 126, 127 and is thereby fixed. Consequently, when drive power is transferred from belt drive mechanism 53 to the connector 125, CIS unit 50 slides in the transverse direction of box 70 (e.g., the direction of an arrow 64 in FIG. 4).

Box 70 has a connector 128 (referring to FIG. 5) and a cable holder 130 (referring to FIG. 4). Connector 128 functions as an output terminal for image signals output by the aforementioned image-receiving elements. Connector 128 is a known multipurpose product that satisfies industry standards, and is fixed at a prescribed location on lower surface 122 of box 70. Connector 128 electrically connects the light source or light-receiving elements of CIS unit 50, and inputs and outputs electrical signals between operating panel 37 or the aforementioned computer. The input and output of electrical signals is mediated by an electric cable (not shown) that is connected to connector 128. The electrical cable is held on cable holder 130, so that the electrical cable may flex in accordance with sliding of box 70.

As shown in FIGS. 3 and 4, guide shaft 52 extends in the transverse direction of box 70. As described above, guide shaft 52 also supports bearing 65 of box 70. Specifically, guide shaft 52 passes through passage holes 121, 122 provided on bosses 118, 119 and supports CIS unit 50. Box 70 slides freely in the longitudinal direction of guide shaft 52 in a condition in which box 70 is supported on guide shaft 52.

In addition, guide shaft 52 is supported by a pair of support plates 133, and support plates 133 are installed on base 43 of main frame 34. Support plates 133 are disposed opposite side walls 44 with a prescribed gap provided between side walls 44 of main frame 34. FIG. 3 shows only the support plate opposite one of side walls 44 of main frame 34, but a support plate that is opposite the other side wall 44 also is installed on base 43. Each support plate 133 has a support groove 135 formed therein that extends vertically. Support groove 135 has an open upper end as shown in the FIG. 5, and the guide shaft 52 fits into support groove 135 from above. In addition, the width-wise dimension of support groove 135 corresponds to the outer diameter of guide shaft 52. Thus, support grooves 135 limit movement of guide shaft 52 in the longitudinal direction while allowing movement in the vertical direction.

Main frame 34 also comprises coil spring 63. Coil spring 63 is interposed between the inner lower surface of lower frame 39 and guide shaft 52. Coil spring 63 elastically urges guide shaft 52 persistently upwards. In this embodiment, two coil springs 63 are provided, and each coil spring 63 is disposed near support plate 133. Consequently, coil springs 63 urge both ends of guide shaft 52 upwards, elastically pressing box 70 onto contact glass plate 35. For this reason, CIS unit 50 and contact glass plate 35 retained in proximity, and the separation between the two components remains constant. As a result, CIS unit 50 may manifest a reliable image reading function.

Image reading device 30 of this embodiment reads the image from the document in the manner described below. First, the document is placed on surface 95 of the contact glass plate 35 which is the document placement surface (referring to FIGS. 2 and 4). In this condition, CIS unit 50 scans the document while being slid by the belt drive mechanism 53 (referring to FIG. 6). Specifically, CIS unit 50 slides along guide shaft 52, during which time the light source provided in box 70 of CIS unit 50 illuminates the document with light, and the reflected light is received by the light-receiving elements. The light-receiving elements output prescribed image signals based on the received light.

Figure 7A:
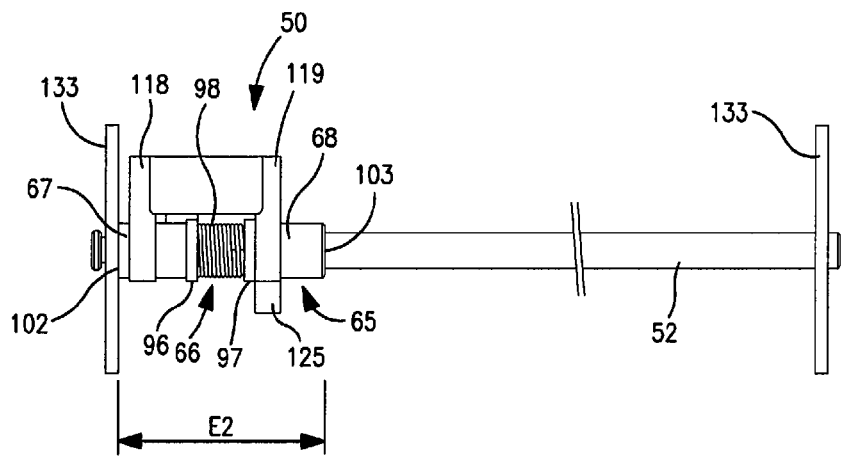
FIG. 7*a-c* depict the function of the device when the CIS unit of the image reading device of the embodiment of the present invention, as depicted in FIG. 2, slides inside the main frame.
Figure 7B:
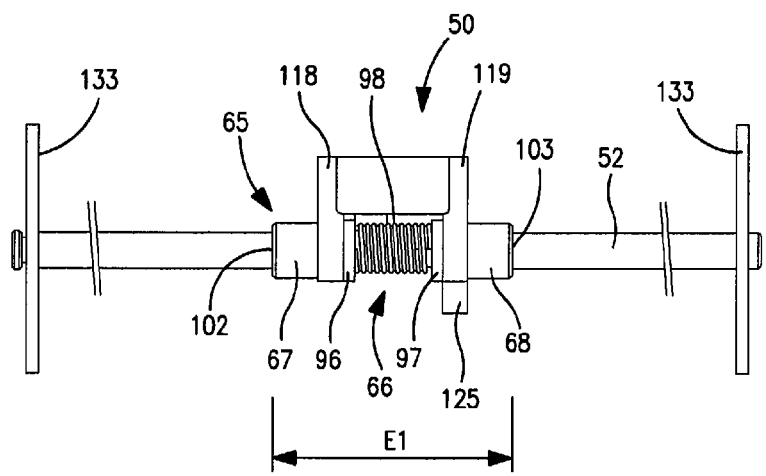
Figure 7C:
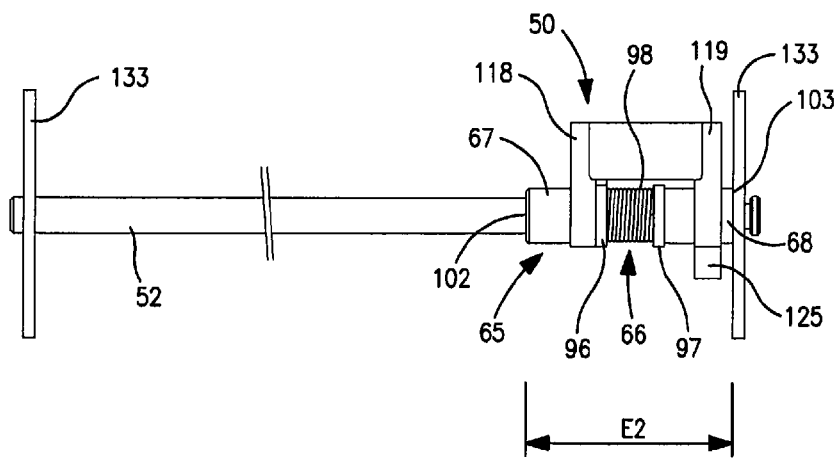

FIG. 7a-c is a diagram that shows the function of the device as CIS unit 50 slides inside the lower frame 39. FIG. 7a shows the condition in which CIS unit 50 abuts support plate 133 on one side of main frame 34 (e.g., the inside wall surface on one side), and FIG. 7b shows the condition in which CIS unit 50 is positioned at the center of main frame 34. FIG. 7c shows the condition in which the CIS unit 50 abuts support plate 133 on the other side of the main frame 34 (e.g., inside wall surface on the other side).

In general, CIS unit 50 remains positioned at the home position into which CIS unit 50 has slid to the far right side, beyond the reference position indicated in FIG. 7a. When the document is being scanned, CIS unit 50 temporarily slides to the above reference position and is initialized at this position. Subsequently, CIS unit 50 slides from the condition shown in FIG. 7a through the condition shown in FIG. 7b to the condition shown in FIG. 7c. Prior to scanning the document, a white correction is carried out between the aforementioned reference position (referring to FIG. 7a) and the aforementioned home position. CIS unit 50 initiates scanning of the document from the position in which it has slid to the right side at a predetermined distance beyond the aforementioned home position (e.g., a scanning initiation position). Scanning is completed at the position shown in FIG. 7c (e.g., a scanning completion position). In this embodiment, the position indicated in FIG. 7c is set as the operation completion position, but the scanning completion position may be set farther to the left of the position indicated in FIG. 7c. In addition, when a plurality of sheets of recording paper are to be continuously scanned using ADF 32, CIS unit 50 is disposed at a prescribed automatic document feed position that is between the aforementioned home position and the aforementioned scanning initiation position.

In order to scan the document, CIS unit 50 slides from the aforementioned home position to the reference position shown in FIG. 7a. At that time, CIS unit 50 presses onto support plate 113 at the left side in the FIG. 7a, and the external dimension of CIS unit 50 changes in the sliding direction. Specifically, end surface 102 of bushing 67 that is urged elastically to the left side in the FIG. 7c abuts support plate 113, thereby being pressed correspondingly to the right. By this means, as shown in FIG. 7a, coil spring 98 bends and bushing 67 is pressed in between bosses 118 and 119. As a result, the external dimension of bearing 65 of CIS unit 50 is reduced in the longitudinal direction of guide shaft 52.

Next, CIS unit 50 slides from the aforementioned reference position through the home position and the position indicated in FIG. 7b and up to the scanning completion position shown in FIG. 7c. When CIS unit 50 has slid to the scanning completion position, CIS unit 50 is pressed onto support plate 113 on the right in the FIG. 7c, and the external dimension of CIS unit 50 changes in the sliding direction. Specifically, end surface 103 of bushing 68 that is urged elastically to the right in the FIG. 7c abuts support plate 113, and is correspondingly pressed to the left. By this means, as shown in FIG. 7c, coil spring 98 bends and bushing 68 is pressed in between bosses 118 and 119. As a result, the external dimension of bearing 65 of CIS unit 50 is reduced in the longitudinal direction of guide shaft 52.

In other words, when CIS unit 50 is positioned at a position other than the aforementioned reference position or scanning completion position, bushing 67 is urged elastically to the left by means of coil spring 98, and bushing 68 is urged elastically to the right. Thus, each of bushings 67 and 68 protrudes beyond boss 118, 119, respectively. Specifically, the external dimension of bearing 65 of CIS unit 50 increases, and CIS unit 50 thus is supported over a broad region E1 in the longitudinal direction of guide shaft 52. On the other hand, when CIS unit 50 slides to the position indicated in FIG. 7c or the position indicated by FIG. 7a, CIS unit 50 is pressed correspondingly by support plate 113, so that the external dimension of CIS unit 50 decreases. Consequently, CIS unit 50 is supported over a narrow region E2 in the longitudinal direction of guide shaft 52.

When the document is to be scanned, the external size of bearing 65 of CIS unit 50 increases in this manner, and bearing 65 is supported over a broad region E1, thereby preventing oscillation or vibration of CIS unit 50 with respect to guide shaft 52 during scanning. As a result, inclination of CIS unit 50 is inhibited during scanning, allowing higher-precision image reading. In addition, when CIS unit 50 is at the aforementioned reference position or scanning completion position, the external size of bearing 65 is reduced, and bearing 65 is supported over a narrow region E2, thus decreasing the dimension of CIS unit 50 in the longitudinal direction of guide shaft 52. Consequently, the dimension of image reading device 30 may be decreased in the longitudinal direction of guide shaft 52, allowing a decrease in the weight and size of image reading device 30. In particular, in this embodiment, CIS unit 50 has a mounted contact image sensor, and, thus, there is the advantage that image reading device 30 may be installed in a more compact form.

In this embodiment, bushings 67, 68 are urged elastically by coil spring 98, so that bushings 67, 68 protrude beyond bosses 118, 119, respectively; and, thus, elastic deformation of bearing 65 is manifested by means of less complicated structure. Consequently, bearing 65 that may undergo external shape deformation in the manner described above may be configured less expensively, thereby decreasing production costs for CIS unit 50 and image reading device 30.

In this embodiment, the pair of bushings 67, 68 are disposed symmetrically on both sides in the longitudinal direction of guide shaft 52, and when CIS unit 50 moves back and forth along guide shaft 52, either of bushings 67, 68 advances to between bosses 118, 119, and, thus, bearing 65 is contracted elastically whether CIS unit 50 is situated at the reference position or the scanning completion position. By this means, image reading device 30 may have an effectively compact design in regard to the longitudinal direction of guide shaft 52.

As shown in FIGS. 4 and 5, because guide shaft 52 inserts through bearing 65, guide shaft 52 is attached directly to box 70 of CIS unit 50. Specifically, with image reading device 30 of this embodiment, CIS unit 50 does not have a carriage that holds box 70. In other words, box 70 of CIS unit 50 also serves as the carriage that holds CIS unit 50. Consequently, the number of parts of CIS unit 50, or the number of parts that constitutes image reading device 30 may be reduced. By decreasing the number of parts in this manner, CIS unit 50 may be more precisely positioned with respect to guide shaft 52.

In addition, in order for an image to be precisely read from the document, it is necessary for the longitudinal direction of CIS unit 50 (also referred to as the primary scanning direction) to be substantially orthogonal to the longitudinal direction of guide shaft 52 (also referred to as the supplemental scanning direction) when CIS unit 50 slides along guide shaft 52. Conversely, if CIS unit 50 is connected to guide shaft 52 via box 70 and the carriage that holds it, then the attachment precision between guide shaft 52 and the carriage and the attachment precision between box 70 and the carriage become factors in determining the positioning precision of CIS unit 50 with respect to guide shaft 52 (e.g., the intersection precision of the two components). Thus, it is generally difficult to achieve an appropriate orthogonal relationship between the longitudinal direction of guide shaft 52 and the longitudinal direction of CIS unit 50.

Nevertheless, in this embodiment, guide shaft 52 is orthogonally connected to box 70, and thus an accurate orthogonal relationship may be achieved readily between the axial direction of guide shaft 52 and the longitudinal direction of CIS unit 50 by accurately attaching box 70 to guide shaft 52. By this means, it is possible to achieve even more detailed image reading by CIS unit 50. Of course, the holder that holds box 7 may be separately provided if an accurate orthogonal relationship is realized between the axial direction of guide shaft 52 and the longitudinal direction of CIS unit 50.

Another embodiment of the present invention is described below.

Figure 8:
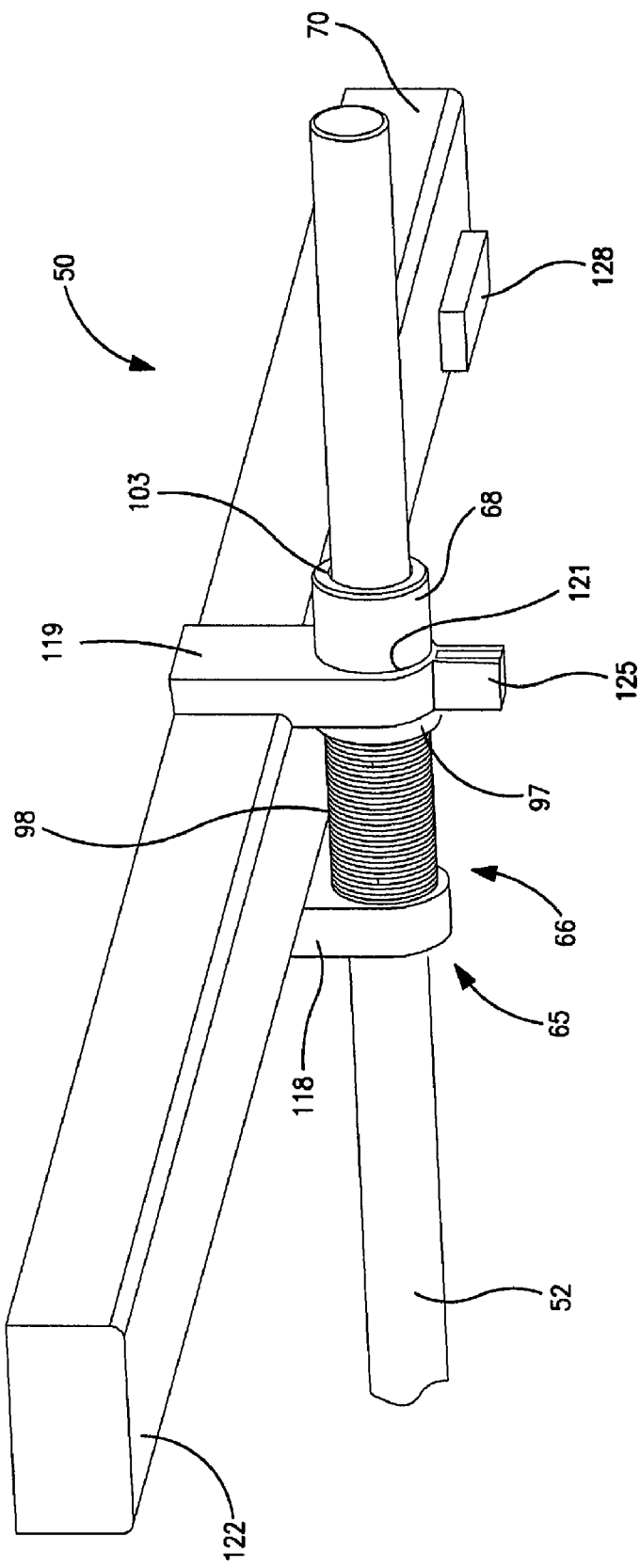
FIG. 8 is an enlarged, perspective view of the CIS unit of the reading device of another embodiment of the present invention.

FIG. 8 is a perspective view of the CIS unit of the second embodiment of the present invention. CIS unit 50 of this embodiment differs from CIS unit 50 of the first embodiment described above insofar as a bushing 68 is provided only on boss 119 of bearing 65, and a cylindrical liner (not shown in the drawings) through which guide shaft 52 inserts is installed in passage hole 121 of boss 118. The remainder of the configuration is similar to CIS unit 50 of the previous embodiment, as presented in the FIGS. 6 and 7a-c.

Figure 9A:
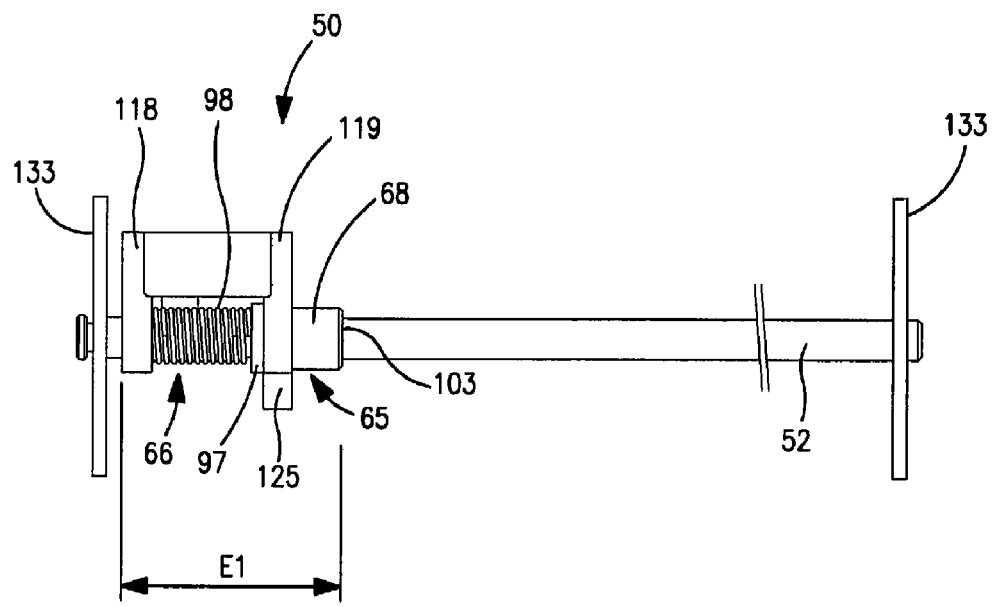
FIGS. 9*a* and 9*b* depict the function of the device when the CIS unit of the image reading device of the embodiment of the present invention, as depicted in FIG. 8, slides inside the main frame.

CIS unit 50 may be configured, so that when the image is not being read, it is situated on standby on the upstream side in the sliding direction (e.g., the longitudinal direction of guide shaft 52). Specifically, CIS unit 50 may be installed, so that it is always at standby in the reference position shown in FIG. 9a. When CIS unit 50 is on standby in this position, there is the advantage that reading of the image may be immediately initiated after the document is placed on contact glass plate 35. Nevertheless, when bushings 67, 68 are provided on each of bosses 118, 119 as in the previous embodiment, coil spring 98 is maintained elastically deformed as shown in FIG. 9a when the image is not being read. Consequently, an outward force is constantly acting on box 70, and there is a constant load on belt drive mechanism 53 (referring to FIG. 3).

Figure 9B:
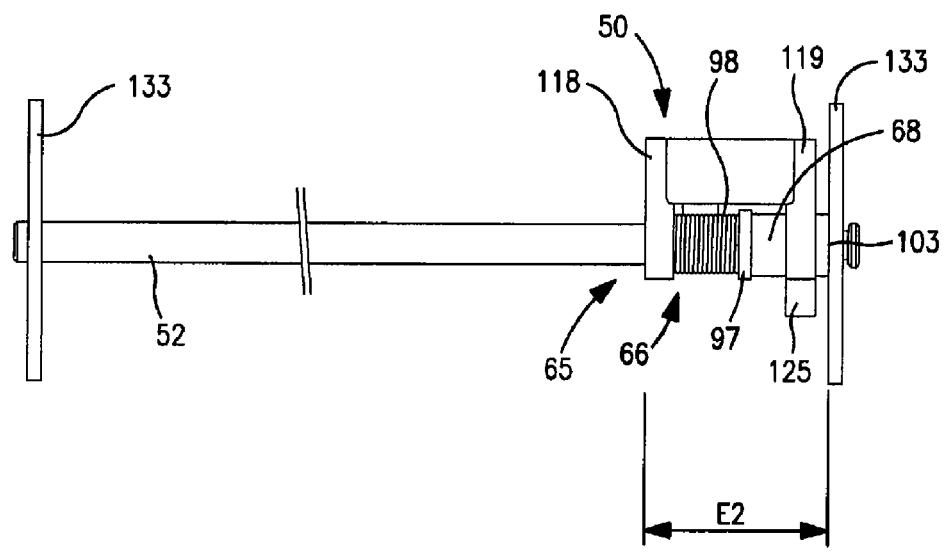

FIGS. 9a and 9b show the function of the device when CIS unit 50 slides through lower frame 39 in this embodiment. FIG. 9a shows a condition in which CIS unit 50 is in proximity to support plate 133 on one side of main frame 34 (e.g., the inner wall surface on one side), and FIG. 9b shows a condition in which CIS unit 50 abuts support plate 133 on the other side of main frame 34 (e.g., the inner wall surface on the other side).

In this embodiment, as shown in FIG. 8, bushing 68 is situated only on the downstream side in the sliding direction of CIS unit 50, and, thus, a load is not continually applied to box 70 of belt drive mechanism 53 when CIS unit 50 is situated at the reference position shown in FIG. 9a (referring to FIG. 4). Consequently, the home position of CIS unit 50 may be placed at the reference position. As a result, reading of the image may be initiated immediately after placing the document on contact glass plate 35 as described above.

When CIS unit 50 slides from the position indicated in FIG. 9a to the position indicated in FIG. 9b in order for CIS unit 50 to scan the document, CIS unit 50 presses on the support plate 133 on the other side. As a result, the outer dimension in the sliding direction of CIS unit 50 changes. Specifically, as in the first embodiment described above, end surface 103 of bushing 68 that has been elastically urged to the right side in the FIG. 9b abuts support plate 133 in the same manner as in the first embodiment, and is correspondingly pressed to the left. By this means, coil spring 98 flexes as shown in FIG. 9b, and bushing 68 inserts in between bosses 118 and 119. As a result, the external dimension of bearing 65 of CIS unit 50 decreases.

Specifically, in this embodiment as well, bushing 68 is urged elastically to the right by coil spring 98 when CIS unit 50 is situated at a position other than the scanning completion position, and bushing 68, thus, protrudes outwards from boss 119. Specifically, the external dimension of bearing 65 of CIS unit 50 increases, and, thus, CIS unit 50 is supported over a broad region E1 in the longitudinal direction of guide shaft 52. On the other hand, when CIS unit 50 slides to the position indicated in FIG. 9b, the CIS unit 50 is pressed correspondingly onto support plate 113, and the external dimension of CIS unit 50 thus decreases. Consequently, CIS unit 50 is supported over a narrow region E2 in the longitudinal direction of guide shaft 52.

In this manner, when a document is to be scanned, the external size of bearing 65 of CIS unit 50 increases, and bearing 65 is supported over a broad region E1, so that oscillation or vibration of CIS unit 50 with respect to guide shaft 52 is prevented during scanning. As a result, inclination of CIS unit 50 is inhibited during scanning, and higher precision image reading is achieved. Moreover, when CIS unit 50 is at the scanning completion position, the external size of bearing 65 decreases, and bearing 65 is supported over a narrow region E2. As a result, the dimension of CIS unit 50 in the longitudinal direction of guide shaft 52, thus, decreases. Consequently, the dimension of image reading device 30 in the longitudinal direction of guide shaft 52 also may be decreased. As a result, a reduction in the size and weight of image reading device 30 is realized. Moreover, an external force does not act on box 70 when CIS unit 50 is positioned at the home position, and a load is not continually placed on belt drive mechanism 53. Consequently, strength design of box 70 of CIS unit 50 and other components is facilitated, increasing the degree of freedom in the design of image reading device 30.

In the above embodiments, configurations were presented in which the external shape of CIS unit 50 deformed, but the present invention pertaining to each of the above embodiments may also be utilized in the printer component of MFDs. The printer capacities of MFDs, for example, may be configured by providing a recording head that records an image by discharge of ink droplets towards recording paper that is being transported while moving back and forth in a direction orthogonal to the transport direction. In this case, the recording head is held on a designated carriage, and the carriage moves back and forth in a direction orthogonal to the transport direction by means of a designated sliding mechanism. The carriage has a bearing 65, as described in each of the above embodiments, and deformation allowance mechanism 66 described above is also provided, so that inclination of the recording head is inhibited as the head moves back and forth, thereby allowing clear image recording to be realized.

Although embodiments of the present invention have been described in detail herein, the scope of the invention is not limited thereto. It will be appreciated by those skilled in the art that various modifications may be made without departing from the scope of the invention. Accordingly, the embodiments disclosed herein are only exemplary. It is to be understood that the scope of the invention is not to be limited thereby, but is to be determined by the claims which follow.

What is claimed is:

1. A scanning unit configured to slide along a guide shaft that extends in a predetermined direction, the scanning unit comprising:
    a carriage configured to slide along the guide shaft,
    a bearing which is disposed on the carriage and through which the guide shaft passes, and
    an elastic deformation allowance mechanism which permits elastic deformation of an external shape of the bearing in the predetermined direction at a predetermined time,
    wherein said bearing comprises a bearing ring which is provided slidably in the predetermined direction on the carriage and through which the guide shaft is disposed, and
    the elastic deformation allowance mechanism comprises an urging member which elastically urges the bearing ring, so that the bearing ring protrudes beyond an outer wall surface of the carriage.

2. The scanning unit of claim 1, further comprising a contact image sensor mounted on the carriage.

3. The scanning unit of claim 1, wherein the carriage comprises a box which contains a light source and a light-receiving element.

4. The scanning unit of claim 1, wherein the bearing ring is disposed on either side of the carriage in the predetermined direction.

5. The scanning unit of claim 1, wherein the bearing ring is disposed on only one side of the carriage in the predetermined direction.

6. The scanning unit of claim 5, wherein the bearing ring is disposed on a down-stream side of the carriage in the predetermined direction.

7. A scanning unit configured to slide along a guide shaft that extends in a predetermined direction, the scanning unit comprising:
    a carriage configured to slide along the guide shaft,
    a bearing which is disposed on the carriage and through which the guide shaft passes, and
    an elastic deformation allowance mechanism which permits elastic deformation of an external shape of the bearing in the predetermined direction at a predetermined time,
    a support plate supporting the guide shaft,
    wherein an external dimension of the bearing increases when the bearing leaves the support plate and
    the external dimension of the bearing decreases when bearing abuts the support plate.

8. An image reading device comprising a casing comprising a contact glass plate configured to receive a document and a scanning unit for scanning said document, which is disposed in the casing and which slides along a guide shaft that extends in a predetermined direction, wherein the scanning unit comprises a carriage, a bearing which is disposed on the carriage and through which the guide shaft passes, and an elastic deformation allowance mechanism which permits elastic deformation of the external shape of the bearing in the predetermined direction at a predetermined time
    wherein the bearing comprises a bearing ring which is disposed slidably in the predetermined direction on the carriage and through which the guide shaft is disposed, and
    the elastic deformation allowance mechanism comprises an urging member which elastically urges the bearing ring, so that the bearing ring protrudes beyond an outer wall surface of the carriage.

9. The image reading device of claim 8, further comprising a contact image sensor mounted on the carriage.

10. The image reading device of claim 8, wherein the carriage comprises a box which contains a light source and a light-receiving element.

11. The image reading device of claim 8, wherein the bearing ring is disposed on either side of the carriage in the predetermined direction.

12. The image reading device of claim 8, wherein the bearing ring is disposed on only one side of the carriage in the predetermined direction.

13. The image reading device of claim 12, wherein the bearing ring is disposed on a down-stream side of the carriage in the predetermined direction.

14. The image reading device of claim 8, further comprising a support plate supporting the carriage, wherein an external dimension of the bearing increases when the bearing ring leaves the support plate and the external dimension of the bearing decreases when the bearing ring abuts the support plate.

* * * * *